US012480670B2

United States Patent
Zhong et al.

(10) Patent No.: US 12,480,670 B2
(45) Date of Patent: Nov. 25, 2025

(54) BEEHIVE INDOOR-AIR ALTERNATE-WORKING DEHUMIDIFICATION SYSTEM WITH STERILIZATION FUNCTION AND METHOD

(71) Applicant: Nanjing Tech University, Nanjing (CN)

(72) Inventors: Zilong Zhong, Nanjing (CN); Jie Liu, Nanjing (CN); Yu Wang, Nanjing (CN); Jinlin Liu, Nanjing (CN); Zhou Zhou, Nanjing (CN); Shuaixing Mai, Nanjing (CN)

(73) Assignee: Nanjing Tech University, Nanjing (CN)

( * ) Notice: Subject to any disclaimer, the term of this patent is extended or adjusted under 35 U.S.C. 154(b) by 356 days.

(21) Appl. No.: 18/358,083

(22) Filed: Jul. 25, 2023

(65) Prior Publication Data

US 2024/0175587 A1 May 30, 2024

(51) Int. Cl.
*B01D 53/26* (2006.01)
*A61L 9/22* (2006.01)
(Continued)

(52) U.S. Cl.
CPC .............. *F24F 3/1429* (2013.01); *A61L 9/22* (2013.01); *B01D 46/0028* (2013.01);
(Continued)

(58) Field of Classification Search
CPC .. F24F 3/1429; F24F 3/16; F24F 11/89; F24F 2003/144; F24F 2110/20; F24F 3/14;
(Continued)

(56) References Cited

U.S. PATENT DOCUMENTS

| | | | | |
|---|---|---|---|---|
| 4,231,768 A | * | 11/1980 | Seibert ................ | B01D 39/14 210/DIG. 5 |
| 4,738,692 A | * | 4/1988 | Fresch ................ | B01D 53/261 95/122 |

(Continued)

FOREIGN PATENT DOCUMENTS

| | | |
|---|---|---|
| CN | 114370677 A | 4/2022 |
| CN | 216522103 U | 5/2022 |

(Continued)

*Primary Examiner* — Frank M Lawrence, Jr.

(57) ABSTRACT

A beehive indoor-air alternate-working dehumidification system includes a fresh air dehumidification sterilization system. The fresh air dehumidification sterilization system includes a fan, a filter, a dehumidification apparatus, a moisture absorbing material, a plasma generator, a temperature and humidity sensor, a heater, and a three-way valve. A hexagonal prism beehive structure is used in a dehumidification apparatus, and a novel moisture absorbing material with high moisture absorption and high temperature sensitivity is used to dehumidify fresh air, to improve a dehumidification capacity and reduce dehumidification energy consumption. The plasma generator generates ions to sterilize and deodorize fresh air. The temperature and humidity sensor detects humidity of fresh air, determines whether the material needs desorption. The heater heats return air to enable the return air to desorb a saturated moisture absorbing material.

9 Claims, 3 Drawing Sheets

(51) Int. Cl.

| | | |
|---|---|---|
| *B01D 46/00* | (2022.01) | |
| *B01D 53/04* | (2006.01) | |
| *B01J 20/04* | (2006.01) | |
| *B01J 20/26* | (2006.01) | |
| *B01J 20/28* | (2006.01) | |
| *B01J 20/34* | (2006.01) | |
| *F24F 3/14* | (2006.01) | |
| *F24F 3/16* | (2021.01) | |
| *F24F 11/89* | (2018.01) | |

(52) U.S. Cl.
 CPC ..... *B01D 46/0036* (2013.01); *B01D 46/0038* (2013.01); *B01D 53/0438* (2013.01); *B01D 53/0446* (2013.01); *B01D 53/0454* (2013.01); *B01D 53/261* (2013.01); *B01J 20/045* (2013.01); *B01J 20/261* (2013.01); *B01J 20/28045* (2013.01); *B01J 20/28047* (2013.01); *B01J 20/3425* (2013.01); *B01J 20/3483* (2013.01); *F24F 3/16* (2013.01); *F24F 11/89* (2018.01); *A61L 2209/111* (2013.01); *A61L 2209/14* (2013.01); *A61L 2209/16* (2013.01); *B01D 2253/112* (2013.01); *B01D 2253/202* (2013.01); *B01D 2253/25* (2013.01); *B01D 2253/3425* (2013.01); *B01D 2257/80* (2013.01); *B01D 2259/4508* (2013.01); *B01D 2279/50* (2013.01); *F24F 2003/144* (2013.01)

(58) Field of Classification Search
 CPC .. A61L 9/22; A61L 2209/111; A61L 2209/14; A61L 2209/16; B01D 46/0028; B01D 46/0036; B01D 46/0038; B01D 53/0438; B01D 53/0446; B01D 53/0454; B01D 53/261; B01D 53/04; B01D 2253/112; B01D 2253/202; B01D 2253/25; B01D 2253/3425; B01D 2257/80; B01D 2259/4508; B01D 2279/50; B01J 20/045; B01J 20/261; B01J 20/28045; B01J 20/28047; B01J 20/3425; B01J 20/3483; Y02A 50/20
 USPC .......... 96/111, 112, 121, 122, 126, 134, 136, 96/146, 154, 223, 224; 95/10, 14, 18, 95/117, 126; 422/1, 24, 120; 34/80, 472, 34/473
 See application file for complete search history.

(56) References Cited

U.S. PATENT DOCUMENTS

| | | | | |
|---|---|---|---|---|
| 4,891,051 | A * | 1/1990 | Frantz | B01D 53/0454 96/144 |
| 9,950,291 | B1 * | 4/2018 | Wright | B01D 53/0423 |
| 2011/0297478 | A1 * | 12/2011 | Billiet | B01D 46/003 55/318 |
| 2016/0101387 | A1 * | 4/2016 | Pedace | B01D 53/0431 96/115 |

FOREIGN PATENT DOCUMENTS

| | | |
|---|---|---|
| CN | 216592010 U | 5/2022 |
| CN | 217584688 U | 10/2022 |

\* cited by examiner

BEEHIVE INDOOR-AIR ALTERNATE-WORKING DEHUMIDIFICATION SYSTEM WITH STERILIZATION FUNCTION AND METHOD

CROSS REFERENCE TO RELATED APPLICATIONS

This application claims foreign priority of Chinese Patent Application No. 202211496127.8, filed on Nov. 25, 2022 in the China National Intellectual Property Administration, the disclosures of all of which are hereby incorporated by reference.

TECHNICAL FIELD

The present invention relates to a beehive indoor-air alternate-working dehumidification system with a sterilization function and method, relating to the field of indoor fresh air dehumidification.

BACKGROUND

With the significant improvement of living standards, people's requirements for human comfort and indoor air quality are getting higher and higher, while the humid environment and air pollution seriously affect people's living conditions. To overcome the adverse impact of high humidity and poor air quality, the humidity of fresh air delivered indoors needs to be controlled within an appropriate range. In addition, fresh air further needs to be sterilized and purified during epidemic prevention and control. A current central air conditioning dehumidification system mainly dehumidifies fresh air through condensing dehumidification and rotary dehumidification. The dehumidification effect of the condensing dehumidification is limited by the ambient temperature. Frosting occurs easily to affect a dehumidification capability, power consumption is huge, operation and maintenance costs are high, and odors and harmful gases cannot be removed. Rotary dehumidification equipment in the conventional technology has disadvantages of high working energy consumption of a motor and limited dehumidification efficiency. Current rotary dehumidification equipment can only filter out dust and impurities in air, but cannot remove odors and purify air, making it impossible to ensure the quality of fresh air delivered indoors.

At present, dehumidification equipment in this field cannot better resolve the above problems. In CN202221727231.9, a multi-functional full heat exchange fresh air dehumidifier includes a main separating and fixing mechanism, an exhaust air insulation mechanism, an air supply dehumidification mechanism, a transfer heat recovery mechanism, and a high-efficiency filtration mechanism, and dries and dehumidifies moist air by using a condenser. The dehumidifier has varied functions, significant air circulation, and good dust removal, but has disadvantages of easy susceptibility to the environment, proneness to frosting in a low-temperature and high-humidity environment, and low dehumidification efficiency. Therefore, more energy needs to be consumed to make the equipment operate, and energy consumption is huge. In addition, a conventional filter cannot sterilize and purify fresh air, and as a result cannot ensure t the air quality of fresh air. In another example, CN202123119949.8 discloses a low-temperature regenerative rotary dehumidifier. The dehumidifier uses a low-temperature regenerative rotary wheel, which is driven by a reducer motor of the rotary wheel to work. A heating coil is used, and heat in high-temperature exhaust gas may be used to implement dehumidification. The dehumidifier is characterized by the full use of waste heat, high safety, and good sealing. However, the moisture absorption efficiency and regeneration efficiency of rotary dehumidification are limited, and motor-driven rotary work has high energy consumption.

In consideration of energy efficiency and the quality of fresh air, a beehive indoor-air alternate-working dehumidification system with a sterilization function and method are designed in the present invention. The system includes a fresh air dehumidification system, a sterilization and disinfection system, and a return air desorption system. The system includes a fan, a filter, a dehumidification apparatus, a moisture absorbing material, a plasma generator, a temperature and humidity sensor, a heater, a three-way valve, and the like. A hexagonal prism beehive structure is used for a dehumidification apparatus, and a novel moisture absorbing material with high moisture absorption and high temperature sensitivity is used to dehumidify fresh air, to improve a dehumidification capacity and reduce dehumidification energy consumption. The filter removes dust in fresh air. An electrode of the plasma generator discharges electricity to generate ions to sterilize and purify fresh air and remove odors, to effectively improve air quality. The temperature and humidity sensor detects the humidity of fresh air, to determine whether the material needs to be desorbed. A by-pass duct is arranged to implement return air. The heater heats return air to enable the return air to desorb a saturated moisture absorbing material, to implement cyclic use of the material. The valve controls two fresh air dehumidification processes and two hybrid dehumidification processes to be alternately performed in a cycle.

SUMMARY

The present invention provides a beehive indoor-air alternate-working dehumidification system with a sterilization function and method. The system includes a fresh air dehumidification system, a sterilization and disinfection system, and a return air desorption system.

The fresh air dehumidification system includes a fan 1, a filter 2, a first three-way valve 3, a first duct 4, a second duct 13, a first dehumidification apparatus 9, a second dehumidification apparatus 10, a first moisture absorbing material 27, a second moisture absorbing material 28, a first temperature and humidity sensor 11, and a second temperature and humidity sensor 12. An inlet of the first three-way valve 3 is connected to the filter 2. A first outlet of the first three-way valve 3 is connected to the first duct 4. A second outlet of the first three-way valve 3 is connected to the second duct 13. The first duct 4 is sequentially connected to the fan 1, the filter 2, the first three-way valve 3, a first sterilization box 5, the first dehumidification apparatus 9, and the first temperature and humidity sensor 11. The second duct 13 is sequentially connected to the first three-way valve 3, a second sterilization box 6, the second dehumidification apparatus 10, and the second temperature and humidity sensor 12. The first moisture absorbing material 27 and the second moisture absorbing material 28 are respectively located inside the first dehumidification apparatus 9 and the second dehumidification apparatus 10.

The sterilization and disinfection system includes a third duct 14, a fourth duct 31, the first sterilization box 5, the second sterilization box 6, a third sterilization box 7, a fourth sterilization box 8, a first sterilizer 15, a second sterilizer 16, a third sterilizer 17, a fourth sterilizer 18, a fifth sterilizer 19, a sixth sterilizer 20, a seventh sterilizer 21, and an eighth sterilizer 22. A left end of the third duct 14 is connected to a right end of the first duct 4 to form one pipe. A left end of the fourth duct 31 is connected to a right end of the second duct 13 to form one pipe. The first sterilization box 5 is mounted at a section in the first duct 4, and is in front of the first three-way valve 3 and behind the first dehumidification apparatus 9 in a flow direction of the first duct 4. The second sterilization box 6 is mounted on the second duct 13, and is in front of the first three-way valve 3 and behind the second dehumidification apparatus 10 in a flow direction of the second duct 13. The third sterilization box 7 is mounted on the third duct 14, and is in front of a second three-way valve 25 and behind a fourth three-way valve 32 in a flow direction of the third duct 14. The fourth sterilization box 8 is mounted on the fourth duct 31 in front of a third three-way valve 26 and behind a fifth three-way valve 33 in a flow direction of the fourth duct 31. The flow directions of the ducts are all from the fan 1 to outlets at distal ends of the third duct 14 and the fourth duct 31. The first sterilizer 15 and the second sterilizer 16 are mounted on a left side and a right side in a box body of the first sterilization box 5. The third sterilizer 17 and the fourth sterilizer 18 are mounted on a left side and a right side in a box body of the second sterilization box 6. The fifth sterilizer 19 and the sixth sterilizer 20 are mounted on a left side and a right side in a box body of the third sterilization box 7. The seventh sterilizer 21 and the eighth sterilizer 22 are mounted on a left side and a right side in a box body of the fourth sterilization box 8.

The return air desorption system includes a first by-pass duct 23, a second by-pass duct 24, the second three-way valve 25, the third three-way valve 26, the fourth three-way valve 32, the fifth three-way valve 33, a first heater 29, a second heater 30, a first drainage hole 34, a second drainage hole 35, a first water storage tray 36, and a second water storage tray 37. An entrance and an outlet of the first by-pass duct 23 are located on two sides of the second sterilization box 6 and are connected to the third duct 14. An inlet of the second three-way valve 25 is connected to an outlet of the first dehumidification apparatus 9. A first outlet of the second three-way valve 25 is connected to an entrance of the third sterilization box 7. A second outlet of the second three-way valve 25 is connected to the first by-pass duct 23. An inlet of the third three-way valve 26 is connected to an outlet of the second dehumidification apparatus 10. A first outlet of the third three-way valve 26 is connected to an entrance of the fourth sterilization box 8. A second outlet of the third three-way valve 26 is connected to the second by-pass duct 24. An entrance and an outlet of the second by-pass duct 24 are located on two sides of the fourth sterilization box 8 and are connected to the fourth duct 31. An inlet of the fourth three-way valve 32 is connected to the distal end of the third duct 14. A first outlet of the fourth three-way valve 32 is connected to an outlet of the third sterilization box 7. A second outlet of the fourth three-way valve 32 is connected to the first by-pass duct 23. An inlet of the fifth three-way valve 33 is connected to the distal end of the fourth duct 31. A first outlet of the fifth three-way valve 33 is connected to an outlet of the fourth sterilization box 8. A second outlet of the fifth three-way valve 33 is connected to the second by-pass duct 24. The first heater 29 is mounted on the first by-pass duct 23. The second heater 30 is mounted on the second by-pass duct 24. The first drainage hole 34 and the second drainage hole 35 are respectively opened in bottoms of left ends of the first dehumidification apparatus 9 and the second dehumidification apparatus 10. The first water storage tray 36 is located below the first drainage hole 34. The second water storage tray 37 is located below the second drainage hole 35.

The first dehumidification apparatus 9 and the second dehumidification apparatus 10 are hexagonal prisms and have a beehive-shaped internal structure.

A sudden expansion pipe is provided at a connection between an entrance of the first dehumidification apparatus 9 and the first duct 4. A reducing pipe is provided at a connection between the outlet of the first dehumidification apparatus 9 and the third duct 14. A sudden expansion pipe is provided at a connection between an entrance of the second dehumidification apparatus 10 and the second duct 13. A reducing pipe is provided at a connection between the outlet of the second dehumidification apparatus 10 and the fourth duct 31.

The first moisture absorbing material 27 is coated on each beehive inner wall of the first dehumidification apparatus 9. The second moisture absorbing material 28 is coated on each beehive inner wall of the second dehumidification apparatus 10.

A partial distance at a front end of each of the first dehumidification apparatus 9 and the second dehumidification apparatus 10 is left uncoated to ensure a stable state during passage of an air flow.

The first moisture absorbing material 27 and the second moisture absorbing material 28 are polyacrylamide hydrogel, and are preferably a temperature-sensitive composite hydrogel material PNIPAM-PPy-$MgSO_4$.

The first to eighth sterilizers 15 to 22 are plasma generator integrated apparatuses. The first sterilization box 5 and the second sterilization box 6 perform sterilization with fresh air and the moisture absorbing materials. The third sterilization box 7 and the fourth sterilization box 8 perform secondary sterilization respectively with fresh air flowing out from the first and second dehumidification apparatuses 9 and 10.

The heaters 29 and 30 are PTC heaters, and provide heat to the return air desorption system, to evaporate water from the saturated first moisture absorbing material 27 or second moisture absorbing material 28.

A duct material of the first duct 4, the second duct 13, the third duct 14, the fourth duct 31, the first by-pass duct 23, and the second by-pass duct 24 is polyurethane. A duct inner wall is coated with an ultrahydrophobic coating, and preferably a nano silicon dioxide silicone/acrylic solution coating, to protect the ducts from oxidation and rusting.

The distal ends of the third duct 14 and the fourth duct 31 are connected to an external environment.

The method includes a first fresh air dehumidification process, a second fresh air dehumidification process, a first hybrid dehumidification process, and a second hybrid dehumidification process. The first hybrid dehumidification process includes the second fresh air dehumidification process and a first return air desorption process that are simultaneously performed. The second hybrid dehumidification process includes the first fresh air dehumidification process and a second return air desorption process that are simultaneously performed.

The first fresh air dehumidification process: when clean and dry fresh air needs to be transferred indoors, an air conditioning room operator controls the system to start equipment. The system controls a first three-way valve 3 to connect a first duct 4 and disconnect a second duct 13, a second three-way valve 25 and a fourth three-way valve 32 to connect a third duct 14 and disconnect a first by-pass duct 23, and a third three-way valve 26 and a fifth three-way valve 33 to disconnect a second by-pass duct 24 and a fourth duct 31. A first sterilization box 5 and a third sterilization box 7 work. A second sterilization box 6 and a fourth sterilization box 8 are turned off. Fresh air enters the first duct 4 through a fan 1, is filtered by a filter 2, is sterilized by the first sterilization box 5, is then dehumidified by a first moisture absorbing material 27 on a first dehumidification apparatus 9, is secondarily sterilized by the third sterilization box 7, and is finally delivered into a distal end of the third duct 14. When an indoor person does not need transfer of fresh air, the air conditioning room operator controls the system to be turned off and stop transfer of fresh air, and work ends.

The second fresh air dehumidification process: when clean and dry fresh air needs to be transferred indoors, the air conditioning room operator controls the system to start the equipment. The system controls the first three-way valve 3 to connect the second duct 13 and disconnect the first duct 4, the third three-way valve 26 and the fifth three-way valve 33 to connect the fourth duct 31 and disconnect the second by-pass duct 24, and the second three-way valve 25 and the fourth three-way valve 32 to disconnect the first by-pass duct 23 and the third duct 14. The second sterilization box 6 and the fourth sterilization box 8 work. The first sterilization box 5 and the third sterilization box 7 are turned off. Fresh air enters the second duct 13 through the fan 1 and the filter 2, is sterilized by the second sterilization box 6, is then dehumidified by a second moisture absorbing material 28 on a second dehumidification apparatus 10, is secondarily sterilized by the fourth sterilization box 8, and is finally delivered into a distal end of the fourth duct 31. When an indoor person does not need transfer of fresh air, the air conditioning room operator controls the system to be turned off and stop transfer of fresh air, and work ends.

The first return air desorption process: a first temperature and humidity sensor 11 detects that a humidity value of fresh air at an outlet of the first dehumidification apparatus 9 is greater than a set standard humidity value by more than 15%. A moisture absorption capability of the first moisture absorbing material 27 cannot reach a dehumidification standard. The system controls the first three-way valve 3 to connect the first duct 4 and the second duct 13, the second three-way valve 25 and the fourth three-way valve 32 to connect the first by-pass duct 23 and disconnect the third duct 14, and the third three-way valve 26 and the fifth three-way valve 33 to connect the fourth duct 31 and disconnect the second by-pass duct 24. A first heater 29 is turned on. The second sterilization box 6 and the fourth sterilization box 8 work. The first sterilization box 5 and the third sterilization box 7 are turned off. Return air flows through the first by-pass duct 23 from the distal end of the third duct 14, and is heated by the first heater 29 to approximately 45° C. Hot air enters the first dehumidification apparatus 9 and desorbs the first moisture absorbing material 27. Evaporated sweat flows out to a first water storage tray 36 through a first drainage hole 34. Return air passes through the first sterilization box 5, finally reaches a diversion port of the first duct 4 and the second duct 13, and is mixed with fresh air in the second fresh air dehumidification process.

The second return air desorption process: when a second temperature and humidity sensor 12 detects that a humidity value of fresh air at an outlet of the second dehumidification apparatus 10 is greater than the set standard humidity value by more than 15%. A moisture absorption capability of the second moisture absorbing material 28 cannot reach the dehumidification standard. The system controls the first three-way valve 3 to connect the first duct 4 and the second duct 13, the third three-way valve 26 and the fifth three-way valve 33 to connect the second by-pass duct 24 and disconnect the fourth duct 31, and the second three-way valve 25 and the fourth three-way valve 32 to connect the fourth duct 31 and disconnect the first by-pass duct 23. A second heater 30 is turned on. The first sterilization box 5 and the third sterilization box 7 work. The second sterilization box 6 and the fourth sterilization box 8 are turned off. Return air flows through the second by-pass duct 24 from the distal end of the fourth duct 31, and is heated by the second heater 30 to approximately 45° C. Hot air enters the second dehumidification apparatus 10 and desorbs the second moisture absorbing material 28. Evaporated sweat flows out to a second water storage tray 37 through a second drainage hole 35. Return air passes through the first sterilization box 5, finally reaches the diversion port of the first duct 4 and the second duct 13, and is mixed with fresh air in the second fresh air dehumidification process.

The first hybrid dehumidification process: the process includes the second fresh air dehumidification process and the first return air desorption process. The first fresh air dehumidification process and the second return air desorption process are simultaneously performed. The first fresh air dehumidification process and the second return air desorption process do not work. Return air of the first return air desorption process finally reaches the diversion port of the first duct 4 and the second duct 13 and is mixed with fresh air in the second fresh air dehumidification process. Dehumidification work is performed. After the system works for 30 min. Water in the first moisture absorbing material 27 is desorbed by 90%. In this case, the first moisture absorbing material 27 does not require desorption. The system controls the second three-way valve 25 and the fourth three-way valve 32 to disconnect the first by-pass duct 23. The first heater 29 is turned off. The first return air desorption process ends. The first fresh air dehumidification process continues. When an indoor person does not need transfer of fresh air, the air conditioning room operator controls the system to be turned off and stop transfer of fresh air, and work ends.

The second hybrid dehumidification process: the process includes the first fresh air dehumidification process and the second return air desorption process. The first fresh air dehumidification process and the second return air desorption process are simultaneously performed. The second fresh air dehumidification process and the first return air desorption process do not work. Return air of the second return air desorption process finally reaches the diversion port of the first duct 4 and the second duct 13, and is mixed with fresh air in the first fresh air dehumidification process. Dehumidification work is performed. After the system works for 30 min. Water in the second moisture absorbing material 28 is desorbed by 90%. In this case, the second moisture absorbing material 28 does not require desorption. The system controls the third three-way valve 26 and the fifth three-way valve 33 to disconnect the second by-pass duct 24. The second heater 30 is turned off. The second return air desorption process ends. The first fresh air dehumidification process continues. When an indoor person does not need transfer of fresh air, the air conditioning room operator controls the system to be turned off and stop transfer of fresh air, and work ends.

According to different indoor and outdoor air states, the first moisture absorbing material 27 and the second moisture absorbing material 28 reach a saturated state after performing moisture absorption for approximately 100 minutes to 120 minutes. After saturation, 90% of water can be desorbed through desorption for approximately 30 minutes to 40 minutes.

In the first hybrid dehumidification process and the second hybrid dehumidification process. A status of processed return air may be controlled through a return air speed and valve opening degrees of the second three-way valve 25, the third three-way valve 26, the fourth three-way valve 32, and the fifth three-way valve 33.

The first fresh air dehumidification process, the first hybrid dehumidification process, the second fresh air dehumidification process, the second hybrid dehumidification process, and the first fresh air dehumidification process form one working period, and are alternately performed in a cycle.

An order of the cycle is: the first fresh air dehumidification process is first performed; then the first fresh air dehumidification process reaches a working limit and stops, and the first return air desorption process and the second fresh air dehumidification process are simultaneously performed; then the first fresh air dehumidification process is restored, the first return air desorption process ends, and the second fresh air dehumidification process continues; then the second fresh air dehumidification process reaches a working limit and stops, and the second return air desorption process and the first fresh air dehumidification process are simultaneously performed; and finally the second fresh air dehumidification process is restored, the second return air desorption process ends, the first fresh air dehumidification process continues until the first fresh air dehumidification process reaches the working limit and stops, and the cycle is continued.

BRIEF DESCRIPTION OF THE DRAWINGS

Reference numerals in FIG. 1: 1. fan, 2. filter, 3. first three-way valve, 4. first duct, 5. first sterilization box, 6. second sterilization box, 7. third sterilization box, 8. fourth sterilization box, 9. first dehumidification apparatus, 10. second dehumidification apparatus, 11. first temperature and humidity sensor, 12. second temperature and humidity sensor, 13. second duct, 14. third duct, 15. first sterilizer, 16. second sterilizer, 17. third sterilizer, 18. fourth sterilizer, 19. fifth sterilizer, 20. sixth sterilizer, 21. seventh sterilizer, 22. eighth sterilizer, 23. first by-pass duct, 24. second by-pass duct, 25. second three-way valve, 26. third three-way valve, 27. first moisture absorbing material, 28. second moisture absorbing material, 29. first heater, 30. second heater, 31. fourth duct, 32. fourth three-way valve, 33. fifth three-way valve, 36. first water storage tray, and 37. second water storage tray.

Reference numerals in FIG. 2: 1. fan, 2. filter, 3. first three-way valve, 4. first duct, 5. first sterilization box, 6. second sterilization box, 7. third sterilization box, 8. fourth sterilization box, 9. first dehumidification apparatus, 10. second dehumidification apparatus, 11. first temperature and humidity sensor, 12. second temperature and humidity sensor, 13. second duct, 14. third duct, 15. first sterilizer, 16. second sterilizer, 17. third sterilizer, 18. fourth sterilizer, 19. fifth sterilizer, 20. sixth sterilizer, 21. seventh sterilizer, 22. eighth sterilizer, 23. first by-pass duct, 24. second by-pass duct, 25. second three-way valve, 26. third three-way valve, 27. first moisture absorbing material, 28. second moisture absorbing material, 29. first heater, 30. second heater, 31. fourth duct, 32. fourth three-way valve, 33. fifth three-way valve, 34. first drainage hole, 35. second drainage hole, 36. first water storage tray, and 37. second water storage tray.

Reference numerals in FIG. 3: 9. first dehumidification apparatus, 10. first dehumidification apparatus, 27. first moisture absorbing material, and 28. second moisture absorbing material.

DESCRIPTION OF THE EMBODIMENTS

Figure 1:
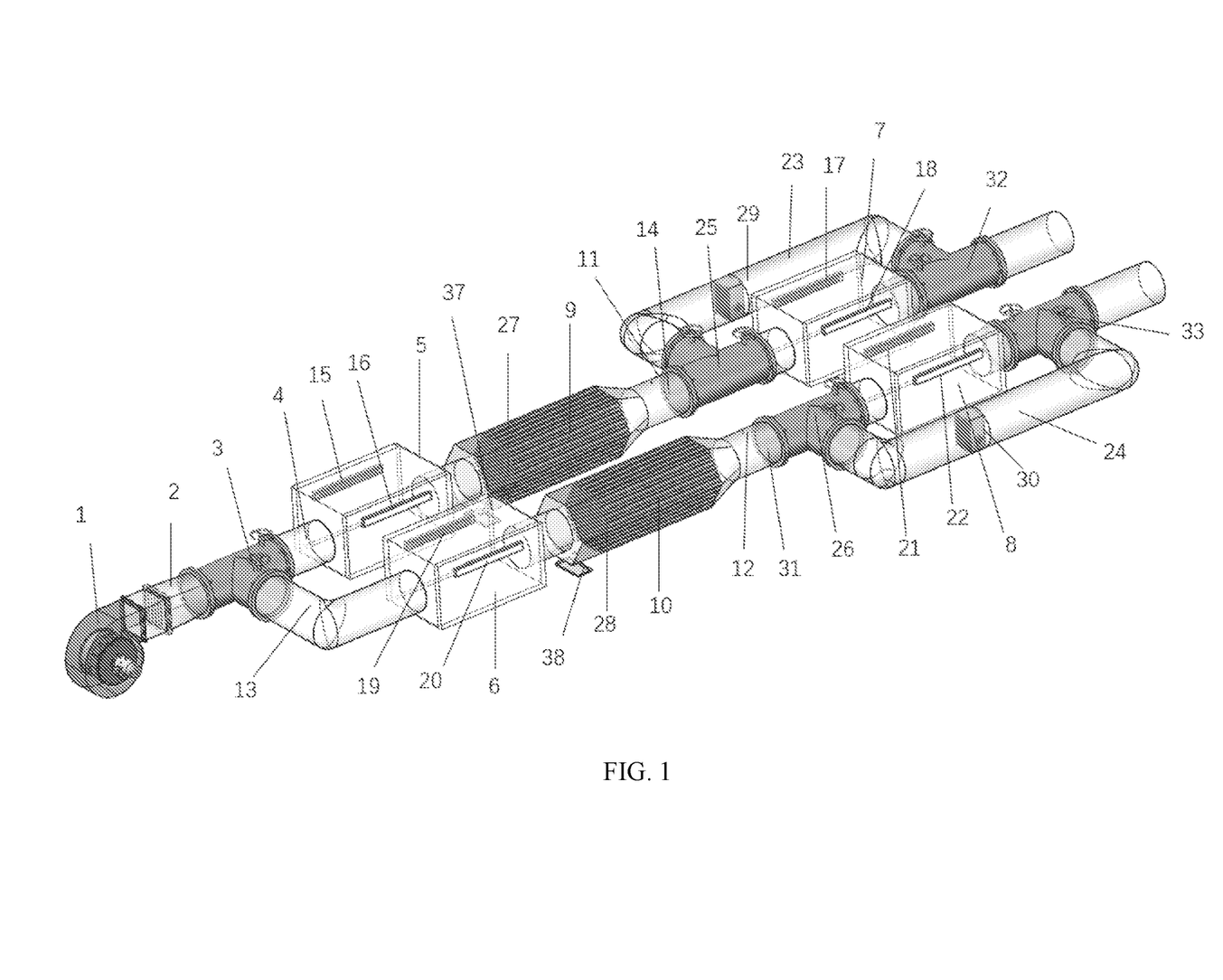
FIG. 1 is a principle diagram according to the present invention.
Figure 2:
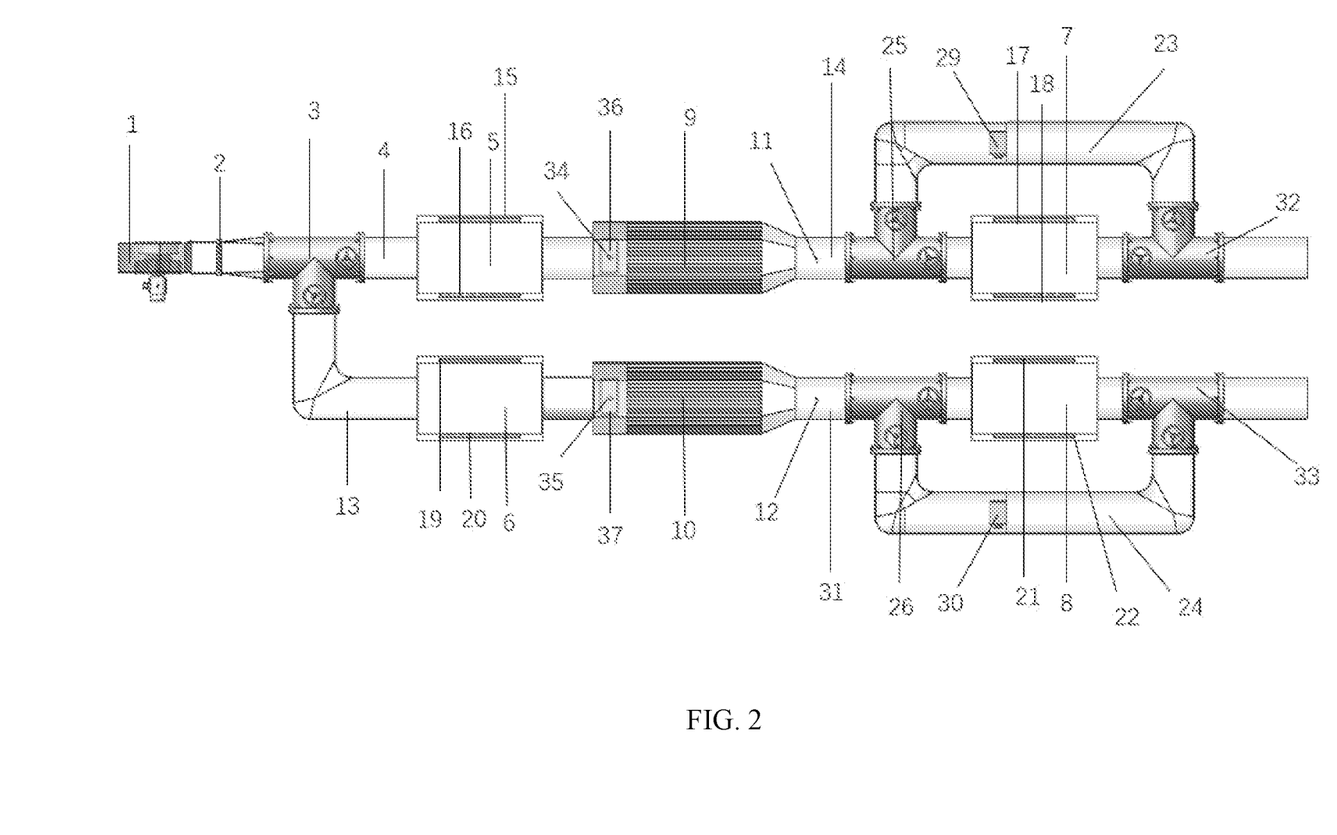
FIG. 2 is a top view according to the present invention.
Figure 3:
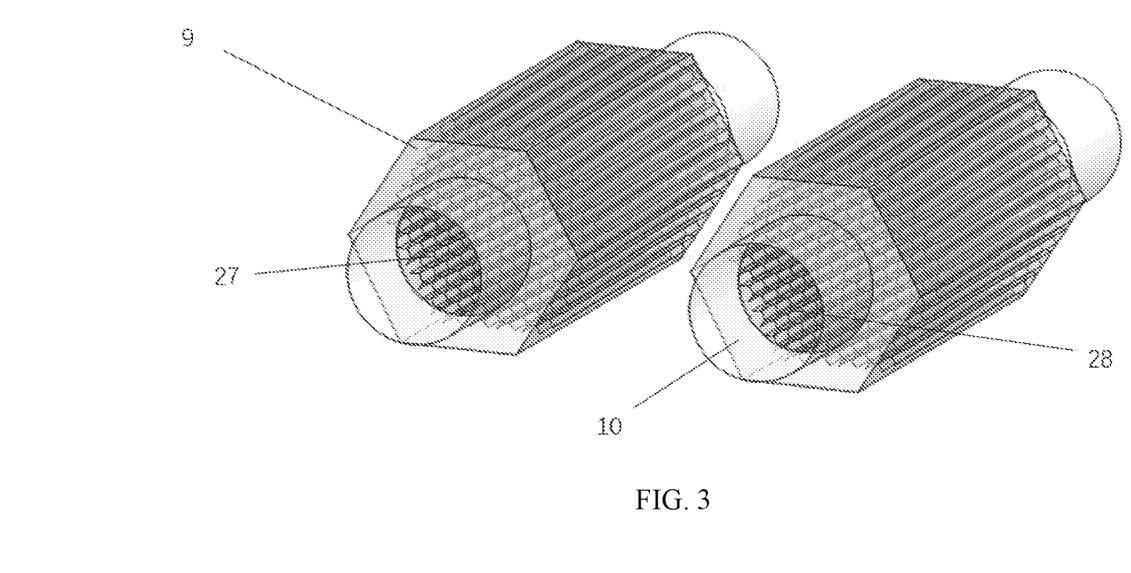
FIG. 3 is a structural diagram of a dehumidification apparatus according to the present invention.

As shown FIG. 1, a central air conditioning dehumidification system that combines a moisture absorbing material and a plasma technology mainly includes a fresh air dehumidification system, a sterilization and disinfection system, and a return air desorption system. Main parts include a fan 1, a filter 2, a first dehumidification apparatus 9, a second dehumidification apparatus 10, a first moisture absorbing material 27, a second moisture absorbing material 28, a first temperature and humidity sensor 11, a second temperature and humidity sensor 12, and first to fourth sterilization boxes 5 to 8, and first and second by-pass ducts 23 and 24.

The system dehumidifies fresh air by using a novel moisture absorbing material. An electrode of a plasma generator discharges electricity to generate ions or the like to sterilize and disinfect fresh air. A heater heats return air to desorb a saturated moisture absorbing material. A fresh air dehumidification process and a hybrid dehumidification process are alternate performed.

When clean and dry fresh air needs to be transferred indoors, an air conditioning room operator controls the system to start the equipment. This is a first fresh air dehumidification process. The system controls a first three-way valve 3 to connect a first duct 4 and disconnect a second duct 13, a second three-way valve 25 and a fourth three-way valve 32 to connect a third duct 14 and disconnect a first by-pass duct 23, and a third three-way valve 26 and a fifth three-way valve 33 to disconnect a second by-pass duct 24 and a fourth duct 31. The first sterilization box 5 and the third sterilization box 7 work. The second sterilization box 6 and the fourth sterilization box 8 are turned off. This is a pure fresh air dehumidification process. The fan 1 draws outdoor fresh air into the equipment to enter the first duct 4. The filter 2 filters out impurities, particles, and the like. A first sterilizer 15 and a second sterilizer 16 in the first sterilization box 5 use a double-medium electrode to discharge electricity to generate ions to perform primary sterilization and purification on the fresh air. Then the first moisture absorbing material 27 on the first dehumidification apparatus 9 performs moisture absorption and dehumidification. In addition, some ions that move with the fresh air may sterilize and disinfect the first moisture absorbing material 27. The fresh air flows through the second sterilization box 6. A third sterilizer 17 and a fourth sterilizer 18 in the second sterilization box 6 generate ions to perform secondary sterilization and purification on the fresh air. The fresh air is finally delivered into a distal end of the third duct 14, to provide dry and clean fresh air indoors.

When the first temperature and humidity sensor 11 detects that a humidity value of fresh air at an outlet of the first dehumidification apparatus 9 is greater than a set standard humidity value by more than 15%, a moisture absorption capability of the first moisture absorbing material 27 cannot reach a dehumidification standard. The first moisture absorbing material 27 needs to be desorbed, to evaporate water from the first moisture absorbing material 27. This is a first hybrid dehumidification process. To be specific, a second fresh air dehumidification process and a first return air desorption system are performed simultaneously. The first fresh air dehumidification process reaches a working limit to stop working. The system controls the first three-way valve 3 to connect the first duct 4 and the second duct 13, the second three-way valve 25 and the fourth three-way valve 32 to connect the first by-pass duct 23 and disconnect the third duct 14, and the third three-way valve 26 and the fifth three-way valve 33 to connect the fourth duct 31 and disconnect the second by-pass duct 24. Opening degrees of all opened valves are adjusted according to indoor and outdoor air states, to control a desorption time. A first heater 29 is turned on. The second sterilization box 6 and the fourth sterilization box 8 work. The first sterilization box 5 and the third sterilization box 7 are turned off. This is a hybrid dehumidification process using fresh air and return air, and includes a fresh air dehumidification process and a return air desorption process. Indoor return air flows from the distal end of the third duct 14 into the first by-pass duct 23. The first heater 29 performs heating to approximately 45° C. Hot air enters the first dehumidification apparatus 9, to desorb the first moisture absorbing material 27. Evaporated sweat flows out from a first drainage hole 34 to a first water storage tray 36. Return air passes through the first sterilization box 5, and finally reaches a diversion port of the first duct 4 and the second duct 13, and is mixed with fresh air in the second fresh air dehumidification process to perform dehumidification work, to provide dry and clean fresh air indoors.

After the system works for 30 min, water in the first moisture absorbing material 27 is desorbed by 90%. The system controls the first three-way valve 3 to disconnect the first duct 4, and the second three-way valve 25 and the fourth three-way valve 32 to disconnect the first by-pass duct 23. The first heater 29 is turned off. The first fresh air dehumidification process is restored. A first return air desorption process ends. The second fresh air dehumidification process continues. The fan 1 draws indoor fresh air into the equipment. The filter 2 filters out impurities, particles, and the like in the fresh air. The fresh air enters the second duct 13. A fifth sterilizer 17 and a sixth sterilizer 18 in the second sterilization box 6 use a double-medium electrode to discharge electricity to generate ions to perform primary sterilization and purification on fresh air. Then the second moisture absorbing material 28 on the second dehumidification apparatus 10 performs moisture absorption and dehumidification. In addition, some ions that move with the fresh air may sterilize and disinfect the second moisture absorbing material 28. The fresh air flows through the fourth sterilization box 8. A seventh sterilizer 21 and an eighth sterilizer 22 in the fourth sterilization box 8 generate ions to perform secondary sterilization and purification on the fresh air. The fresh air is finally delivered into a distal end of the fourth duct 31, to provide dry and clean fresh air indoors.

When the second temperature and humidity sensor 12 detects that a humidity value of fresh air at an outlet of the second dehumidification apparatus 10 is greater than the set standard humidity value by more than 15%, a moisture absorption capability of the second moisture absorbing material 28 cannot reach the dehumidification standard. The second moisture absorbing material 28 needs to be desorbed, to evaporate water from the second moisture absorbing material 28. This is a second hybrid dehumidification process. To be specific, the first fresh air dehumidification process and a second return air desorption process are simultaneously performed. The second fresh air dehumidification process reaches a working limit to stop working.

The system controls the first three-way valve 3 to connect the first duct 4 and the second duct 13, the third three-way valve 26 and the fifth three-way valve 33 to connect the second by-pass duct 24 and disconnect the fourth duct 31, and the second three-way valve 25 and the fourth three-way valve 32 to connect the fourth duct 31 and disconnect the first by-pass duct 23. In addition, the opening degrees of all opened valves are adjusted according to indoor and outdoor air states, to control the desorption time. A second heater 30 is turned on. The first sterilization box 5 and the third sterilization box 7 work. The second sterilization box 6 and the fourth sterilization box 8 are turned off. This is a hybrid dehumidification process using fresh air and return air, and includes the fresh air dehumidification process and the return air desorption process. Indoor return air flows through the second by-pass duct 24 from the distal end of the fourth duct 31. The second heater 30 performs heating to approximately 45° C. Hot air enters the second dehumidification apparatus 10, to desorb the second moisture absorbing material 28. Evaporated sweat flows out from a second drainage hole 35 to a second water storage tray 37. Return air passes through the first sterilization box 5, finally reaches the diversion port of the first duct 4 and the second duct 13, and is mixed with fresh air in the first fresh air dehumidification process to perform dehumidification work, to provide dry and clean fresh air indoors.

After the system works for 30 min, water in the second moisture absorbing material 28 is desorbed by 90%. Dehumidification operation ends. The second fresh air dehumidification process is restored. The second return air desorption process ends. The first fresh air dehumidification process continues. The system controls the first three-way valve 3 to disconnect the second duct 13, and the third three-way valve 26 and the fifth three-way valve 33 to disconnect the second by-pass duct 24. The second heater 30 is turned off. The second return air desorption process ends. The first fresh air dehumidification process continues, to provide dry and clean fresh air indoors. When the first fresh air dehumidification process reaches the working limit, a desorption process of the first moisture absorbing material 27 and a dehumidification process of the second moisture absorbing material 28 continue to be performed.

The foregoing is one working cycle, and the processes are alternately performed in the cycle. When an indoor person does not need transfer of fresh air, the air conditioning room operator controls the system to be turned off, transfer of fresh air is stopped, and work ends.

In the present invention, the moisture absorption performance of a novel moisture absorbing material with high moisture absorption and high temperature sensitivity and efficient sterilization and purification performance of a plasma technology are used, and a beehive indoor-air alternate-working dehumidification system with a sterilization function is designed. The system includes a fresh air dehumidification system, a sterilization and disinfection system, and a return air desorption system. A hexagonal prism beehive structure is used for a dehumidification apparatus, and a novel moisture absorbing material with high moisture absorption and high temperature sensitivity is used to dehumidify fresh air, to improve a dehumidification capacity and reduce dehumidification energy consumption. The filter removes dust in fresh air. An electrode of the plasma generator discharges electricity to generate ions to sterilize and purify fresh air and remove odors, to effectively improve air quality. The temperature and humidity sensor detects the humidity of fresh air, to determine whether the material needs to be desorbed. A by-pass duct is arranged to implement return air. The heater heats return air to enable the return air to desorb a saturated moisture absorbing material, to implement cyclic use of the moisture absorbing material. The valve controls two fresh air dehumidification processes and two hybrid dehumidification processes to be alternately performed. The implementation of the patent can dehumidify and sterilize fresh air in an effective and energy-efficient manner, so that energy can be saved and a comfortable indoor living environment can be created.

What is claimed is:

1. A beehive indoor-air alternate-working dehumidification system with a sterilization function, comprising:
   a fresh air dehumidification system, a sterilization and disinfection system, and a return air desorption system, wherein
   the fresh air dehumidification system comprises a fan (1), a filter (2), a first three-way valve (3), a first duct (4), a second duct (13), a first dehumidification apparatus (9), a second dehumidification apparatus (10), a first moisture absorbing material (27), a second moisture absorbing material (28), a first temperature and humidity sensor (11), and a second temperature and humidity sensor (12), an inlet of the first three-way valve (3) is connected to the filter (2), a first outlet of the first three-way valve (3) is connected to the first duct (4), a second outlet of the first three-way valve (3) is connected to the second duct (13), the first duct (4) is sequentially connected to the fan (1), the filter (2), the first three-way valve (3), a first sterilization box (5), the first dehumidification apparatus (9), and the first temperature and humidity sensor (11), the second duct (13) is sequentially connected to the first three-way valve (3), a second sterilization box (6), the second dehumidification apparatus (10), and the second temperature and humidity sensor (12), and the first moisture absorbing material (27) and the second moisture absorbing material (28) are respectively located inside the first dehumidification apparatus (9) and the second dehumidification apparatus (10);
   the sterilization and disinfection system comprises a third duct (14), a fourth duct (31), the first sterilization box (5), the second sterilization box (6), a third sterilization box (7), a fourth sterilization box (8), a first sterilizer (15), a second sterilizer (16), a third sterilizer (17), a fourth sterilizer (18), a fifth sterilizer (19), a sixth sterilizer (20), a seventh sterilizer (21), and an eighth sterilizer (22), a left end of the third duct (14) is connected to a right end of the first duct (4) to form one pipe, and a left end of the fourth duct (31) is connected to a right end of the second duct (13) to form one pipe; the first sterilization box (5) is mounted at a section in the first duct (4), and is in front of the first three-way valve (3) and behind the first dehumidification apparatus (9) in a flow direction of the first duct (4), the second sterilization box (6) is mounted on the second duct (13), and is in front of the first three-way valve (3) and behind the second dehumidification apparatus (10) in a flow direction of the second duct (13), the third sterilization box (7) is mounted on the third duct (14), and is in front of a second three-way valve (25) and behind a fourth three-way valve (32) in a flow direction of the third duct (14), the fourth sterilization box (8) is mounted on the fourth duct (31) in front of a third three-way valve (26) and behind a fifth three-way valve (33) in a flow direction of the fourth duct (31), and the flow directions of the ducts are all from the fan (1) to outlets at distal ends of the third duct (14) and the fourth duct (31); and the first sterilizer (15) and the second sterilizer (16) are mounted on a left side and a right side in a box body of the first sterilization box (5), the third sterilizer (17) and the fourth sterilizer (18) are mounted on a left side and a right side in a box body of the second sterilization box (6), the fifth sterilizer (19) and the sixth sterilizer (20) are mounted on a left side and a right side in a box body of the third sterilization box (7), and the seventh sterilizer (21) and the eighth sterilizer (22) are mounted on a left side and a right side in a box body of the fourth sterilization box (8); and
   the return air desorption system comprises a first by-pass duct (23), a second by-pass duct (24), the second three-way valve (25), the third three-way valve (26), the fourth three-way valve (32), the fifth three-way valve (33), a first heater (29), a second heater (30), a first drainage hole (34), a second drainage hole (35), a first water storage tray (36), and a second water storage tray (37), an entrance and an outlet of the first by-pass duct (23) are located on two sides of the second sterilization box (6) and are connected to the third duct (14), an inlet of the second three-way valve (25) is connected to an outlet of the first dehumidification apparatus (9), a first outlet of the second three-way valve (25) is connected to an entrance of the third sterilization box (7), a second outlet of the second three-way valve (25) is connected to the first by-pass duct (23), an inlet of the third three-way valve (26) is connected to an outlet of the second dehumidification apparatus (10), a first outlet of the third three-way valve (26) is connected to an entrance of the fourth sterilization box (8), a second outlet of the third three-way valve (26) is connected to the second by-pass duct (24), an entrance and an outlet of the second by-pass duct (24) are located on two sides of the fourth sterilization box (8) and are connected to the fourth duct (31), an inlet of the fourth three-way valve (32) is connected to the distal end of the third duct (14), a first outlet of the fourth three-way valve (32) is connected to an outlet of the third sterilization box (7), a second outlet of the fourth three-way valve (32) is connected to the first by-pass duct (23), an inlet of the fifth three-way valve (33) is connected to the distal end of the fourth duct (31), a first outlet of the fifth three-way valve (33) is connected to an outlet of the fourth sterilization box (8), and a second outlet of the fifth three-way valve (33) is connected to the second by-pass duct (24); the first heater (29) is mounted on the first by-pass duct (23), and the second heater (30) is mounted on the second by-pass duct (24); and the first drainage hole (34) and the second drainage hole (35) are respectively opened in bottoms of left ends of the first dehumidification apparatus (9) and the second dehumidification apparatus (10), the first water storage tray (36) is located below the first drainage hole (34), and the second water storage tray (37) is located below the second drainage hole (35).

2. The beehive indoor-air alternate-working dehumidification system with a sterilization function according to claim 1, wherein
   the first dehumidification apparatus (9) and the second dehumidification apparatus (10) are hexagonal prisms and have a beehive-shaped internal structure; and
   a sudden expansion pipe is provided at a connection between an entrance of the first dehumidification apparatus (9) and the first duct (4), a reducing pipe is provided at a connection between the outlet of the first dehumidification apparatus (9) and the third duct (14), a sudden expansion pipe is provided at a connection between an entrance of the second dehumidification apparatus (10) and the second duct (13), and a reducing pipe is provided at a connection between the outlet of the second dehumidification apparatus (10) and the fourth duct (31).

3. The beehive indoor-air alternate-working dehumidification system with a sterilization function according to claim 2, wherein
the first moisture absorbing material (27) is coated on each beehive inner wall of the first dehumidification apparatus (9), and the second moisture absorbing material (28) is coated on each beehive inner wall of the second dehumidification apparatus (10);
a partial distance at a front end of each of the first dehumidification apparatus (9) and the second dehumidification apparatus (10) is left uncoated to ensure a stable state during passage of an air flow; and
the first moisture absorbing material (27) and the second moisture absorbing material (28) are polyacrylamide hydrogel, or are a temperature-sensitive composite hydrogel material PNIPAM-PPy-$MgSO_4$.

4. The beehive indoor-air alternate-working dehumidification system with a sterilization function according to claim 1, wherein
the first to eighth sterilizers (15 to 22) are plasma generator integrated apparatuses, and the first sterilization box (5) and the second sterilization box (6) perform sterilization with fresh air and the moisture absorbing materials; and the third sterilization box (7) and the fourth sterilization box (8) perform secondary sterilization respectively with fresh air flowing out from the first and second dehumidification apparatuses (9 and 10); and
the heaters (29 and 30) are PTC heaters, and provide heat to the return air desorption system, to evaporate water from the saturated first moisture absorbing material (27) or second moisture absorbing material (28).

5. The beehive indoor-air alternate-working dehumidification system with a sterilization function according to claim 1, wherein
a duct material of the first duct (4), the second duct (13), the third duct (14), the fourth duct (31), the first by-pass duct (23), and the second by-pass duct (24) is polyurethane, and a duct inner wall is coated with an ultrahydrophobic coating, or a nano silicon dioxide silicone/acrylic solution coating, to protect the ducts from oxidation and rusting; and
the distal ends of the third duct (14) and the fourth duct (31) are connected to an external environment.

6. A method for the beehive indoor-air alternate-working dehumidification system with a sterilization function according to claim 1, comprising:
a first fresh air dehumidification process, a second fresh air dehumidification process, a first hybrid dehumidification process, and a second hybrid dehumidification process, wherein the first hybrid dehumidification process comprises the second fresh air dehumidification process and a first return air desorption process that are simultaneously performed, and the second hybrid dehumidification process comprises the first fresh air dehumidification process and a second return air desorption process that are simultaneously performed, wherein
the first fresh air dehumidification process: when clean and dry fresh air needs to be transferred indoors, an air conditioning room operator controls the system to start equipment, the system controls a first three-way valve (3) to connect a first duct (4) and disconnect a second duct (13), a second three-way valve (25) and a fourth three-way valve (32) to connect a third duct (14) and disconnect a first by-pass duct (23), and a third three-way valve (26) and a fifth three-way valve (33) to disconnect a second by-pass duct (24) and a fourth duct (31), a first sterilization box (5) and a third sterilization box (7) work, and a second sterilization box (6) and a fourth sterilization box (8) are turned off; and fresh air enters the first duct (4) through a fan (1), is filtered by a filter (2), is sterilized by the first sterilization box (5), is then dehumidified by a first moisture absorbing material (27) on a first dehumidification apparatus (9), is secondarily sterilized by the third sterilization box (7), and is finally delivered into a distal end of the third duct (14), and when an indoor person does not need transfer of fresh air, the air conditioning room operator controls the system to be turned off and stop transfer of fresh air, and work ends;
the second fresh air dehumidification process: when clean and dry fresh air needs to be transferred indoors, the air conditioning room operator controls the system to start the equipment, the system controls the first three-way valve (3) to connect the second duct (13) and disconnect the first duct (4), the third three-way valve (26) and the fifth three-way valve (33) to connect the fourth duct (31) and disconnect the second by-pass duct (24), and the second three-way valve (25) and the fourth three-way valve (32) to disconnect the first by-pass duct (23) and the third duct (14), the second sterilization box (6) and the fourth sterilization box (8) work, and the first sterilization box (5) and the third sterilization box (7) are turned off; and fresh air enters the second duct (13) through the fan (1) and the filter (2), is sterilized by the second sterilization box (6), is then dehumidified by a second moisture absorbing material (28) on a second dehumidification apparatus (10), is secondarily sterilized by the fourth sterilization box (8), and is finally delivered into a distal end of the fourth duct (31), and when an indoor person does not need transfer of fresh air, the air conditioning room operator controls the system to be turned off and stop transfer of fresh air, and work ends;
the first return air desorption process: the first temperature and humidity sensor (11) detects that a humidity value of fresh air at an outlet of the first dehumidification apparatus (9) is greater than a set standard humidity value by more than 15%, a moisture absorption capability of first absorbing (27) the moisture material cannot reach a dehumidification standard, the system controls the first three-way valve (3) to connect the first duct (4) and the second duct (13), the second three-way valve (25) and the fourth three-way valve (32) to connect the first by-pass duct (23) and disconnect the third duct (14), and the third three-way valve (26) and the fifth three-way valve (33) to connect the fourth duct (31) and disconnect the second by-pass duct (24), a first heater (29) is turned on, the second sterilization box (6) and the fourth sterilization box (8) work, and the first sterilization box (5) and the third sterilization box (7) are turned off; and return air flows through the first by-pass duct (23) from the distal end of the third duct (14), and is heated by the first heater (29) to approximately 45° C., hot air enters the first dehumidification apparatus (9) and desorbs the first moisture absorbing material (27), evaporated sweat flows out to the first water storage tray (36) through the first drainage hole (34), and return air passes through the first sterilization box (5), finally reaches a diversion port of the first duct (4) and the second duct (13), and is mixed with fresh air in the second fresh air dehumidification process;

the second return air desorption process: when the second temperature and humidity sensor (12) detects that a humidity value of fresh air at an outlet of the second dehumidification apparatus (10) is greater than the set standard humidity value by more than 15%, a moisture absorption capability of the second moisture absorbing material (28) cannot reach the dehumidification standard, the system controls the first three-way valve (3) to connect the first duct (4) and the second duct (13), the third three-way valve (26) and the fifth three-way valve (33) to connect the second by-pass duct (24) and disconnect the fourth duct (31), and the second three-way valve (25) and the fourth three-way valve (32) to connect the fourth duct (31) and disconnect the first by-pass duct (23), a second heater (30) is turned on, the first sterilization box (5) and the third sterilization box (7) work, and the second sterilization box (6) and the fourth sterilization box (8) are turned off; and return air flows through the second by-pass duct (24) from the distal end of the fourth duct (31), and is heated by the second heater (30) to approximately 45° C., hot air enters the second dehumidification apparatus (10) and desorbs the second moisture absorbing material (28), evaporated sweat flows out to the second water storage tray (37) through the second drainage hole (35), and return air passes through the first sterilization box (5), finally reaches the diversion port of the first duct (4) and the second duct (13), and is mixed with fresh air in the second fresh air dehumidification process;

the first hybrid dehumidification process: the process comprises the second fresh air dehumidification process and the first return air desorption process, the first fresh air dehumidification process and the second return air desorption process are simultaneously performed, the first fresh air dehumidification process and the second return air desorption process do not work, return air of the first return air desorption process finally reaches the diversion port of the first duct (4) and the second duct (13) and is mixed with fresh air in the second fresh air dehumidification process, dehumidification work is performed, after the system works for 30 min, water in the first moisture absorbing material (27) is desorbed by 90%, in this case, the first moisture absorbing material (27) does not require desorption, the system controls the second three-way valve (25) and the fourth three-way valve (32) to disconnect the first by-pass duct (23), the first heater (29) is turned off, the first return air desorption process ends, the first fresh air dehumidification process continues, and when an indoor person does not need transfer of fresh air, the air conditioning room operator controls the system to be turned off and stop transfer of fresh air, and work ends; and the second hybrid dehumidification process: the process comprises the first fresh air dehumidification process and the second return air desorption process, the first fresh air dehumidification process and the second return air desorption process are simultaneously performed, the second fresh air dehumidification process and the first return air desorption process do not work, return air of the second return air desorption process finally reaches the diversion port of the first duct (4) and the second duct (13), and is mixed with fresh air in the first fresh air dehumidification process, and dehumidification work is performed; and after the system works for 30 min, water in the second moisture absorbing material (28) is desorbed by 90%, and in this case, the second moisture absorbing material (28) does not require desorption, the system controls the third three-way valve (26) and the fifth three-way valve (33) to disconnect the second by-pass duct (24), the second heater (30) is turned off, the second return air desorption process ends, the first fresh air dehumidification process continues, and when an indoor person does not need transfer of fresh air, the air conditioning room operator controls the system to be turned off and stop transfer of fresh air, and work ends.

7. The method for the beehive indoor-air alternate-working dehumidification system with a sterilization function according to claim 6, wherein
according to different indoor and outdoor air states, the first moisture absorbing material (27) and the second moisture absorbing material (28) reach a saturated state after performing moisture absorption for approximately 100 minutes to 120 minutes, and after saturation, 90% of water can be desorbed through desorption for approximately 30 minutes to 40 minutes.

8. The method for the beehive indoor-air alternate-working dehumidification system with a sterilization function according to claim 6, wherein
in the first hybrid dehumidification process and the second hybrid dehumidification process, a status of processed return air can be controlled through a return air speed and valve opening degrees of the second three-way valve (25), the third three-way valve (26), the fourth three-way valve (32), and the fifth three-way valve (33).

9. The method for the beehive indoor-air alternate-working dehumidification system with a sterilization function according to claim 6, wherein
the first fresh air dehumidification process, the first hybrid dehumidification process, the second fresh air dehumidification process, the second hybrid dehumidification process, and the first fresh air dehumidification process form one working period, and are alternately performed in a cycle; and
an order of the cycle is: the first fresh air dehumidification process is first performed; then the first fresh air dehumidification process reaches a working limit and stops, and the first return air desorption process and the second fresh air dehumidification process are simultaneously performed; then the first fresh air dehumidification process is restored, the first return air desorption process ends, and the second fresh air dehumidification process continues; then the second fresh air dehumidification process reaches a working limit and stops, and the second return air desorption process and the first fresh air dehumidification process are simultaneously performed; and finally the second fresh air dehumidification process is restored, the second return air desorption process ends, the first fresh air dehumidification process continues until the first fresh air dehumidification process reaches the working limit and stops, and the cycle is continued.

* * * * *